DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED MARCH 14, 1972

896 O.G. 421

T896,029

POLYMER CROSS-LINKING

Henry C. Tillson, Wilmington, Del., assignor to Hercules Incorporated, Wilmington, Del.

Continuation of application Ser. No. 803,987, Apr. 3, 1969. This application Mar. 1, 1971, Ser. No. 120,046

Int. Cl. C08f *27/06*

U.S. Cl. 260—79

No Drawing. 17 Pages Specification

Epihalohydrin polymers, homopolymers as well as copolymers with other epoxides or oxetanes, can be cross-linked by heating within the range of from about 250° F. to about 380° F. in admixture with at least one metal compound selected from salts of aromatic carboxylic acids, salts of aliphatic carboxylic acids, salts of carbonic acid, salts of phosphorous acid, salts of silicic acid and oxides of the metals of Group II–A, II–B and IV–A of the Periodic Table, such as the lead oxides or salts of the above acids, and at least one triazine-2-thione having the general formula

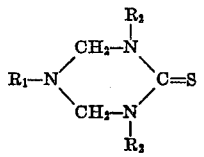

where $R_1$ is selected from alkyl, cycloalkyl and hydrogen radicals and $R_2$ and $R_3$ are hydrogen or lower alkyl radicals. The cross-linkable composition of the epihalohydrin polymer, metal salt or oxide and triazine-2-thione is storage stable at normal room temperatures and can be shipped without fear of cross-linking.